US012613166B1

(12) United States Patent
Palmer

(10) Patent No.: US 12,613,166 B1
(45) Date of Patent: Apr. 28, 2026

(54) APPARATUS AND METHOD FOR PRODUCING CONSISTENT BLOOD AND BONE MARROW SMEARS

(71) Applicant: Adrian P. Palmer, Fort Myers, FL (US)

(72) Inventor: Adrian P. Palmer, Fort Myers, FL (US)

( * ) Notice: Subject to any disclaimer, the term of this patent is extended or adjusted under 35 U.S.C. 154(b) by 535 days.

(21) Appl. No.: 17/710,562

(22) Filed: Mar. 31, 2022

Related U.S. Application Data

(60) Provisional application No. 63/169,142, filed on Mar. 31, 2021.

(51) Int. Cl.
*G01N 1/28* (2006.01)
*B05C 11/02* (2006.01)
*B05C 11/04* (2006.01)

(52) U.S. Cl.
CPC .......... *G01N 1/2813* (2013.01); *B05C 11/023* (2013.01); *B05C 11/04* (2013.01)

(58) Field of Classification Search
USPC ........................................ 118/100, 236, 238
See application file for complete search history.

(56) References Cited

U.S. PATENT DOCUMENTS

| | | | |
|---|---|---|---|
| 1,858,308 A | 5/1932 | Schiller | |
| 3,470,847 A | 10/1969 | Chapin et al. | |
| 3,683,850 A | 8/1972 | Grabhorn | |

| | | | |
|---|---|---|---|
| 3,880,111 A | * 4/1975 | Levine | G01N 1/2813 |
| | | | 118/100 |
| 3,995,022 A | 11/1976 | Heanley et al. | |
| 4,061,108 A | 12/1977 | Levine et al. | |
| 4,319,542 A | * 3/1982 | Ojima | G01N 35/00029 |
| | | | 118/238 |
| 4,359,013 A | 11/1982 | Prevo | |
| 4,378,333 A | * 3/1983 | Laipply | G01N 1/2813 |
| | | | 600/580 |
| 4,407,843 A | 10/1983 | Sasaki et al. | |
| 4,494,479 A | 1/1985 | Drury et al. | |
| 5,356,595 A | 10/1994 | Kanamori et al. | |
| 6,083,759 A | 7/2000 | Teshima | |
| 7,368,080 B2 | 5/2008 | Tamura et al. | |
| 9,121,798 B2 | 9/2015 | Nordberg et al. | |
| 2006/0263249 A1 | 11/2006 | Nakaya et al. | |
| 2018/0238778 A1 | 8/2018 | Nordberg et al. | |

FOREIGN PATENT DOCUMENTS

| | | |
|---|---|---|
| DE | 439124 | 1/1927 |
| EP | 0047189 A1 | 3/1982 |
| EP | 0107372 A2 | 5/1984 |
| EP | 2565617 A1 | 3/2013 |
| WO | WO2019162736 A1 | 8/2019 |

* cited by examiner

*Primary Examiner* — Yewebdar T Tadesse
(74) *Attorney, Agent, or Firm* — John Rizvi; John Rizvi, P.A.—The Patent Professor®

(57) ABSTRACT

The present invention is directed toward an apparatus for producing consistent blood and bone marrow smears. The apparatus may include a smearer configured to receive a planar smear slide. The smearer may include an angled portion that comes into contact with the planar smear slide and creates the smear. The apparatus operates by allowing users of all skill levels to prepare a blood or bone marrow smear sample.

20 Claims, 8 Drawing Sheets

APPARATUS AND METHOD FOR PRODUCING CONSISTENT BLOOD AND BONE MARROW SMEARS

CROSS-REFERENCE TO RELATED APPLICATIONS

This application claims the benefit of U.S. Provisional Patent Application No. 63/169,142, filed on Mar. 31, 2021, which is incorporated by reference herein in its entirety.

FIELD OF THE INVENTION

The present invention relates generally to an apparatus and method for preparing a biological sample for testing. More particularly, the present invention relates to an apparatus and method for producing consistent blood and bone borrow smears. The present invention aims to improve the overall quality of blood and bone marrow smear samples.

BACKGROUND OF THE INVENTION

The preparation of peripheral blood and bone marrows smears are a common diagnostic tool used in the field of hematology. A blood smear is a drop of blood spread thinly onto a glass slide that is then treated with a special stain and the blood cells on the slide are examined and evaluated. Traditionally, trained laboratorians have examined blood smears manually using a microscope. More recently, automated digital systems have become available to help analyze blood smears more efficiently. A blood smear is a snapshot of the cells that are present in the blood at the time the sample is obtained. The blood smear allows for the evaluation of white blood cells, red blood cells, and platelets.

A blood smear is often used to categorize and/or identify conditions that affect one or more type of blood cells and to monitor individuals undergoing treatment for these conditions. There are many diseases, disorders, and deficiencies that can affect the number and type of blood cells produced, their function, and their lifespan. Examples include anemia, myeloproliferative neoplasms, bone marrow disorders, and leukemia.

A fresh, well-made, peripheral blood smear is crucial for accurate cell morphology assessment. Smears are most commonly made using the "spread" or "wedge" technique. Manual smears are made by placing a drop of blood on one side of a glass slide, and spreading this by rapidly moving a second glass slide or spreader across the first slide at an angle. A well-made peripheral smear is thick (red blood cells are overlapping) at the frosted end and becomes progressively thinner with good separation of cells toward the opposite end. The so-called "zone of morphology", the area of optimal thickness for light microscopic examination, should be at least 2 cm in length. The smear should occupy the central area of the slide and be margin-free at the edges.

Producing a good quality smear requires practice. Improper smearing may cause morphological changes in the cells, making the microscopic appearance of the cells misleading. The blood smear must not be too thin or too thick and the tail of the smear must be smooth. Factors such as size of the blood drop, angle of the spreader slide, speed of smearing, steadiness of the hand holding the spreader slide and amount of pressure applied onto the blood drop affect the quality of the blood smear. Since specimens are varied in properties such as particle density and viscosity, some of the specimens may result smears unsuitable for observation if the smearing conditions are fixed at any times.

Although smears were made by trained laboratorians in the past, those tasks are now delegated to less trained personnel as a result of recent changes in the health care delivery pattern. Accordingly, there remains a need in the art for a solution to at least one of the aforementioned problems. For instance, a device that can produce consistent blood and bone marrow smears of strong quality is desired. This includes producing smears of optimal length and thickness. Additionally, a method of using the device is desired wherein both trained professionals as well as less trained personnel can consistently produce quality smears using the device.

SUMMARY OF THE INVENTION

The present invention is directed to an apparatus for producing consistent blood and bone marrow smear samples. The apparatus includes a base having a plurality of receivers, wherein each of the plurality of receivers is configured to hold a glass slide. Each of the receivers may further include a pair of tracks or grooves which facilitate the placement of the glass slides therein. With respect to the glass slides, one support may be designed to hold a smear slide while another support may be configured to hold a spreader slide. Additionally, a method for using the apparatus is also provided.

The blood and bone marrow smearing apparatus may solve a number of problems currently associated with producing constant, quality blood and bone marrow smears. Firstly, the apparatus and method assist in standardizing the process for making consistent, high quality blood and bone marrow smears. Secondly, the apparatus is better able to create smears of adequate length and thickness compared to other conventional solutions. This is critical because adequate length and thickness of the smear sample is needed for the sample to be analyzed. Lastly, the apparatus is designed to provide the most optimal conditions for producing blood and bone marrow samples.

In a first implementation of the invention, an apparatus for producing blood and bone marrow smears comprises:
- a slidable smearer configured to hold a planar smear slide, the slidable smearer including a left portion, a right portion, and an angular spreader portion; and
- a top portion connecting the left portion and the right portion, the top portion having the angular spreader portion protruding from at least one end of the top portion; wherein
- the angular spreader portion is configured to spread and smear at least one of blood and bone marrow placed on the planar smear slide when the slidable smearer is slid along a length of the planer smear slide.

In a second aspect, the slidable smearer may be fabricated from a plastic.

In another aspect, the left portion and the right portion of the slidable smearer may include an inner surface and an outer surface.

In another aspect, the inner surface and the outer surface may each include a groove.

In another aspect, the groove may be configured to receive the planar smear slide.

In another aspect, the left portion and the right portion of the slidable smearer may be curved and angled outward.

In another aspect, the left portion and the right portion of the slidable smearer may be configured to allow a fingers of a user to slide the slidable smearer.

In another aspect, the slidable smearer may conform to an inverted U-shape.

In another aspect, the angular spreader portion may include a proximal end and a distal end.

In another aspect, the proximal end of the angular spreader portion may connect to the top portion of the slidable smearer.

In another aspect, the distal end of the angular spreader portion may be configured to spread and smear the at least one of blood and bone marrow placed on the planar smear slide.

In another aspect, the distal end of angular spreader portion may be angled at an acute angle relative to the planar smear slide.

In another aspect, the acute angle may be 30 degrees.

In another implementation of the invention, a method of using the apparatus for producing blood and bone marrow smears comprises:

> obtaining an apparatus for producing blood and bone marrow smears, the apparatus for producing blood and bone marrow smears having a slidable smearer configured to hold a planar smear slide, the slidable smearer including a left portion, a right portion, and an angular spreader portion, wherein the angular spreader portion rests at an acute angle with respect to the planar smear slide;
>
> placing a drop of blood or bone marrow aspirate on the smear slide;
>
> pulling the spreader slide back until the spreader slide touches the drop;
>
> spreading the drop evenly along a front surface of the spreader slide; and
>
> pushing the spreader slide completely through the of the smear slide, so as to create a smear with uniform lateral margins.

In another aspect, the planar smear slide may contain a label at at least one of the proximal end and the distal end of the smear slide, wherein the drop of blood or bone marrow aspirate may be placed directly in front of the label.

In another aspect, the acute angle is 30 degrees.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward an apparatus for producing consistent blood and bone marrow smears. The apparatus may include a smearer configured to receive a planar smear slide. The smearer may include an angled portion that comes into contact with the planar smear slide and creates the smear. The apparatus operates by allowing users of all skill levels to prepare a blood or bone marrow smear sample. More particularly, the apparatus provides greater structural rigidity while making the smear, result in in strong sample of appropriate thickness and length.

Figure 1:
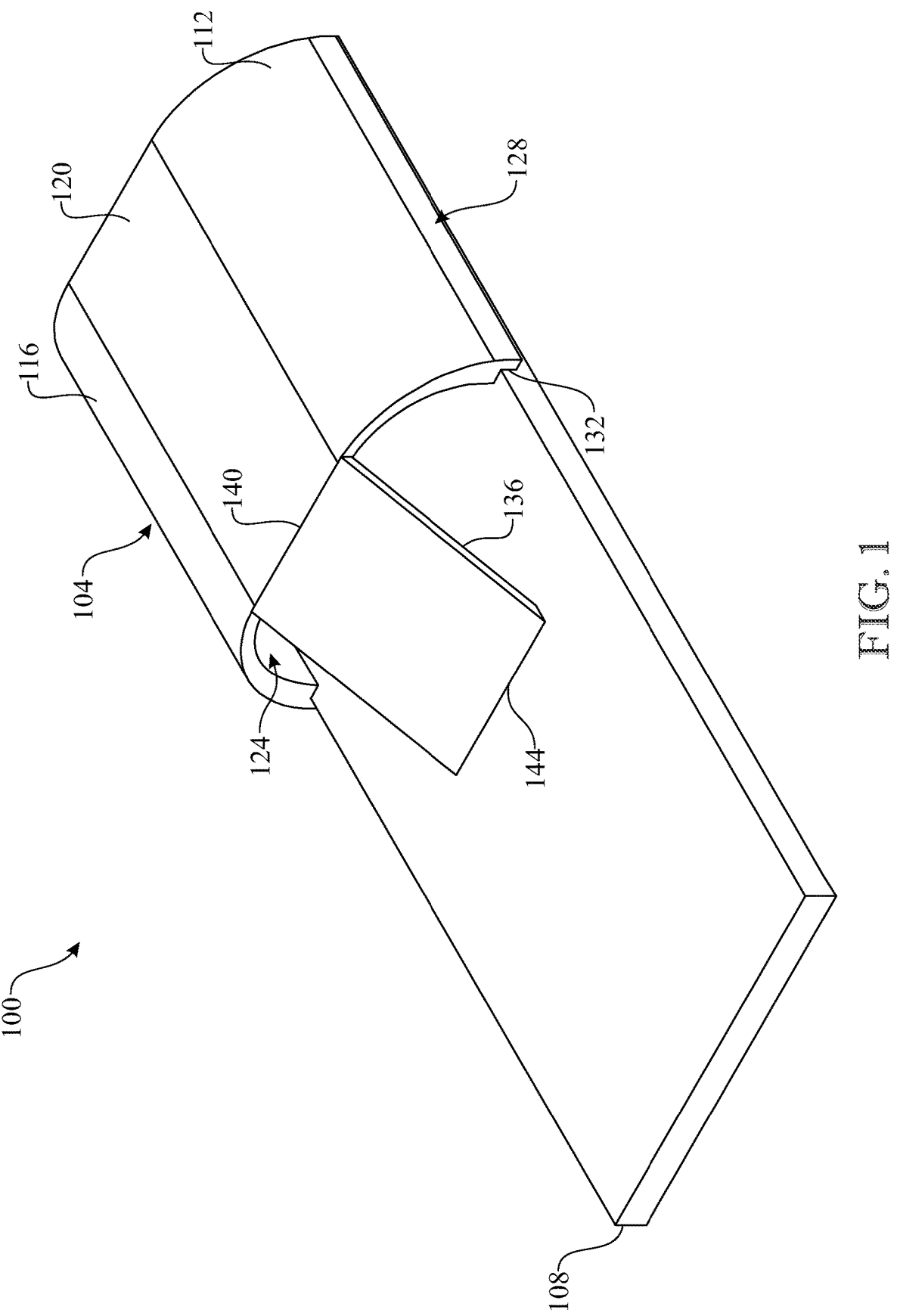
FIG. 1 presents a side, perspective view of an apparatus for producing consistent blood and bone marrow smears in accordance with a first illustrative embodiment of the invention.
Figure 2:
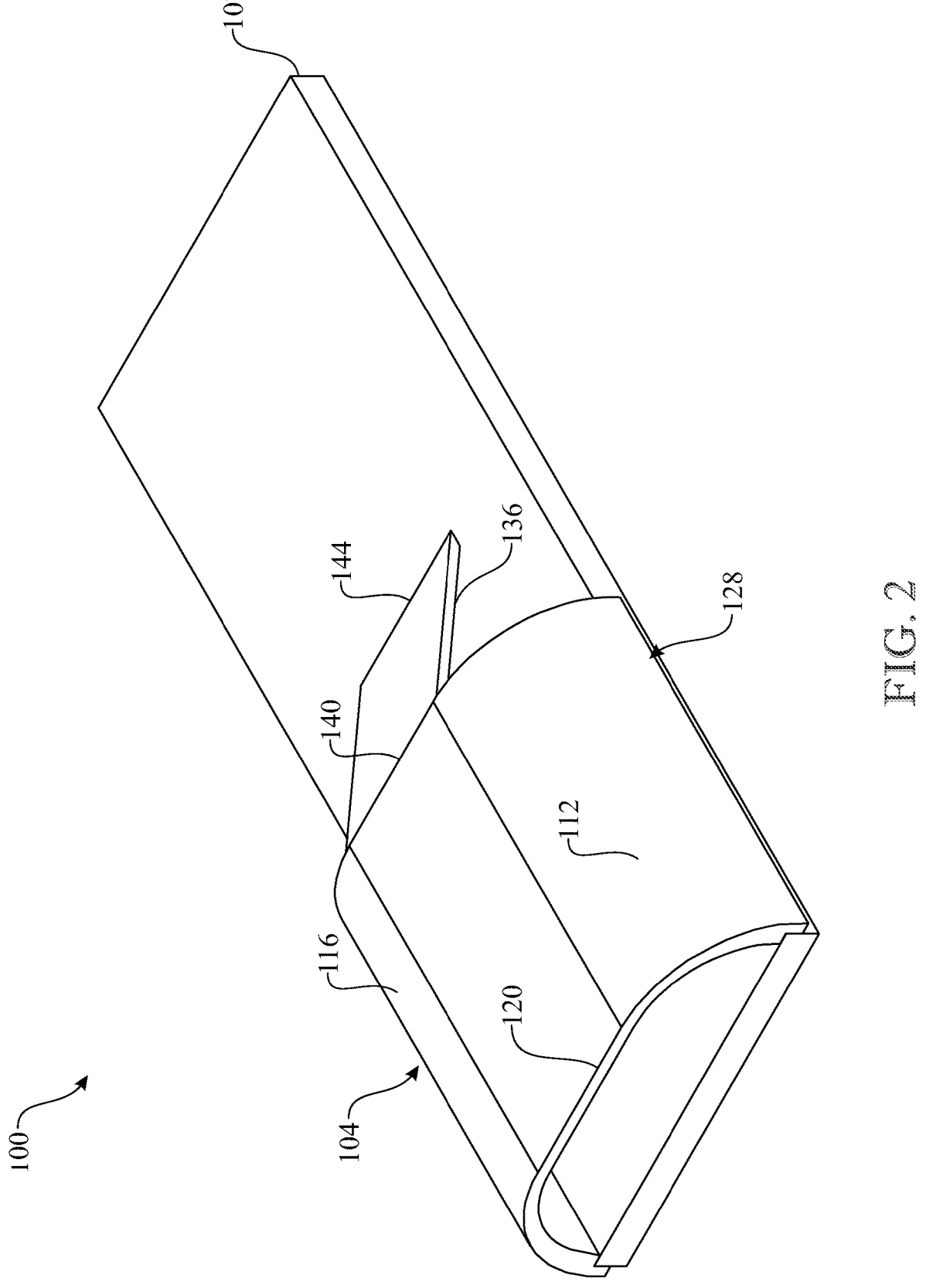
FIG. 2 presents a back, perspective view of the apparatus for producing consistent blood and bone marrow smears illustrated in FIG. 1.
Figure 3:
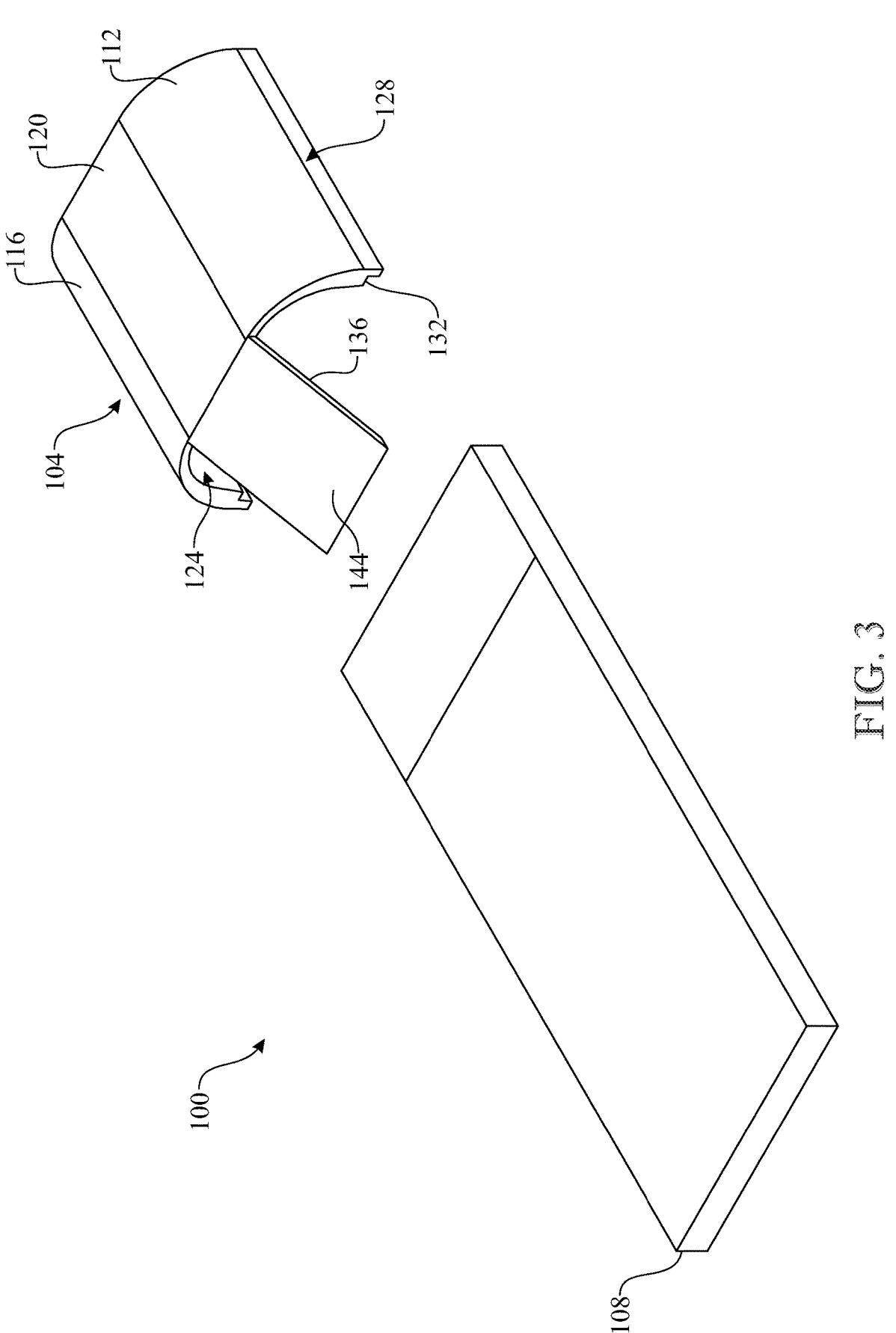
FIG. 3 presents a perspective, exploded view of the apparatus for producing consistent blood and bone marrow smears illustrated in FIG. 1.
Figure 4:
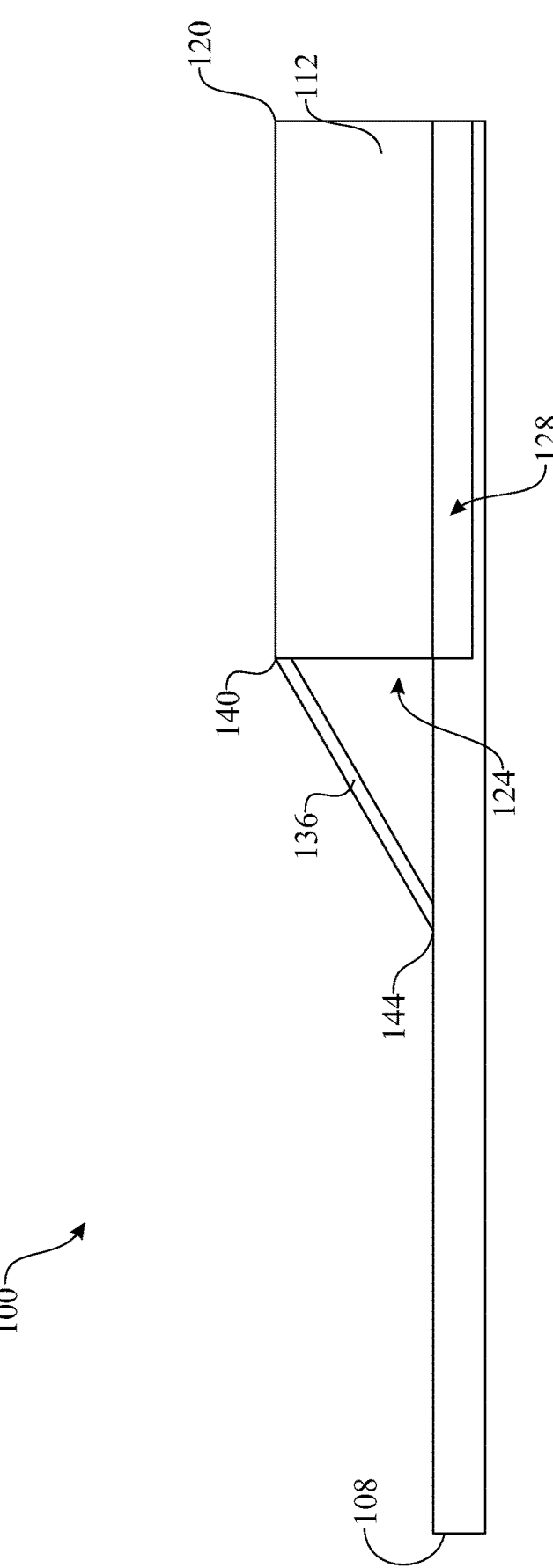
FIG. 4 presents a cross-sectional, side view of the apparatus for producing consistent blood and bone marrow smears illustrated in FIG. 1.

Referring initially to FIG. 1, an apparatus 100 for producing consistent blood and bone marrow smears is illustrated in accordance with an exemplary embodiment of the present invention. As best shown in FIG. 3, the apparatus 100 has a slidable smearer 104 configured to hold a planar smear slide 108. The slidable smearer 104 may be configured to slide along a length of the planar smear slide 108, so as to a blood or bone marrow smear.

Referring to FIGS. 1-4, the slidable smearer 104 may include a left portion 112, a right portion 116, and a top portion 120. The top portion 120 may connect the left portion 112 to the right portion 116. The left portion 112 and the right portion 116 may each be curved and angled outward. Additionally, the left portion 112 and the right portion 116 may have an indeterminate thickness, such that both the left portion 112 and the right portion 116 have an inner surface 124 and an outer surface 128. The inner surface 124 may include a groove 132. The groove 132 may be configured to receive the planar smear slide 108. The groove 132 may run an indeterminate distance along the side of the planar smear slide 108, allowing the smearer 104 to move along a side of the slide. The groove 132 preferably does not sit at any point underneath the planar smear slide 108.

With continued reference to FIGS. 1-4, the slidable smearer 104 may include an angular spreader portion 136 protruding from at least one end of the top portion 120. The angular spreader portion may include a proximal end 140 and a distal end 144. The proximal end 140 of the angular spreader portion 136 may connect to the top portion 120 of the smearer 104. The distal end 144 of the angular spreader portion 136 may be configured to spread and smear the at least one of blood and bone marrow placed on the planar smear slide 108, as best shown in FIGS. 5-8 and will be described in greater detail hereinafter. The distal end 144 of the angular spreader portion 136 may be may be angled at an acute angle relative to the planar smear slide 104. The acute angle may be, for instance 30 degrees. The smearer 104 may conform to an inverted U-shape and may be fabricated from a plastic.

The illustrations of FIGS. 5-8 demonstrate an example method of operation of the apparatus 100 for creating consistent blood and bone marrow smears. As shown initially in FIG. 5, the planar smear slide 108 is placed within the grooves 132 of the inner surface 124 of the left portion 112 and the right portion 116 of the smearer 104. More particularly, either a proximal end or a distal end of the smear slide 108 are placed within the grooves 132. The grooves 132 may be configured to allow the smear slide 108 to slide in a longitudinal direction along the length of the slide 108.

Figure 5:
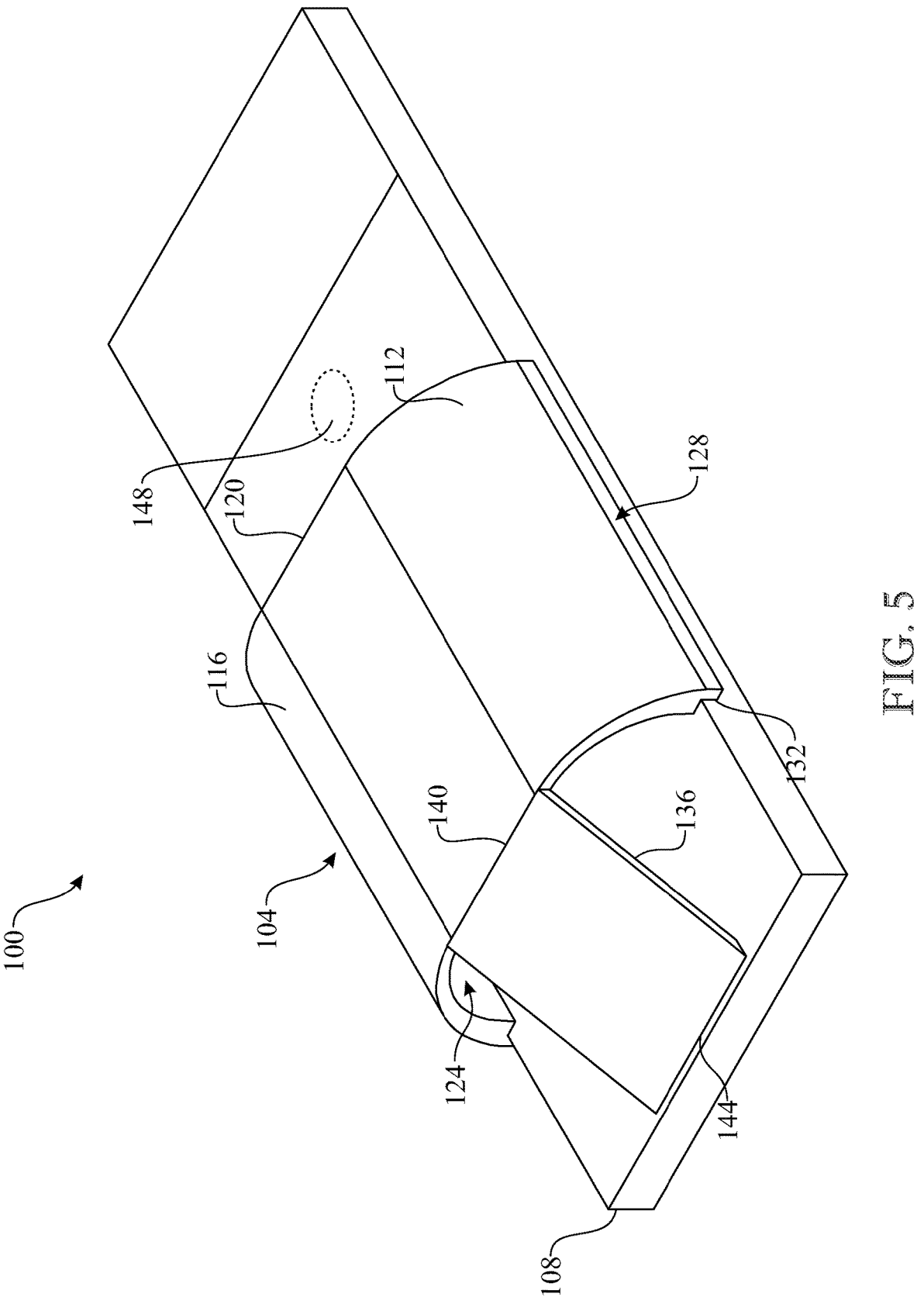
FIG. 5 presents a perspective view of the apparatus for producing consistent blood and bone marrow smears illustrated in FIG. 1, shown with at least one blood droplet placed on the planar smear slide.

With continued reference to FIG. 5, after both the smear slide 108 has been placed within the smearer 104, at least one droplet of blood or bone marrow aspirate 148 may be placed on the smear slide 108. After being placed on the smear slide, the distal end 144 of the angular spreader portion 136 of the smearer 104 may come into contact with the smear slide 108 may be placed in front of the at least one blood droplet or bone marrow aspirate 148 This may be accomplished by having the user pull along the smearer 108 with their fingers. More particularly, the user's fingers may be placed on the left portion 112 and the right portion 116 of the smearer 108, such that the smear slide 108 slides within the grooves 132 of the smearer 104. Alternatively, the user may place their fingers on a top surface and a bottom surface of the top portion 120 to move the smearer 104.

Figure 6:
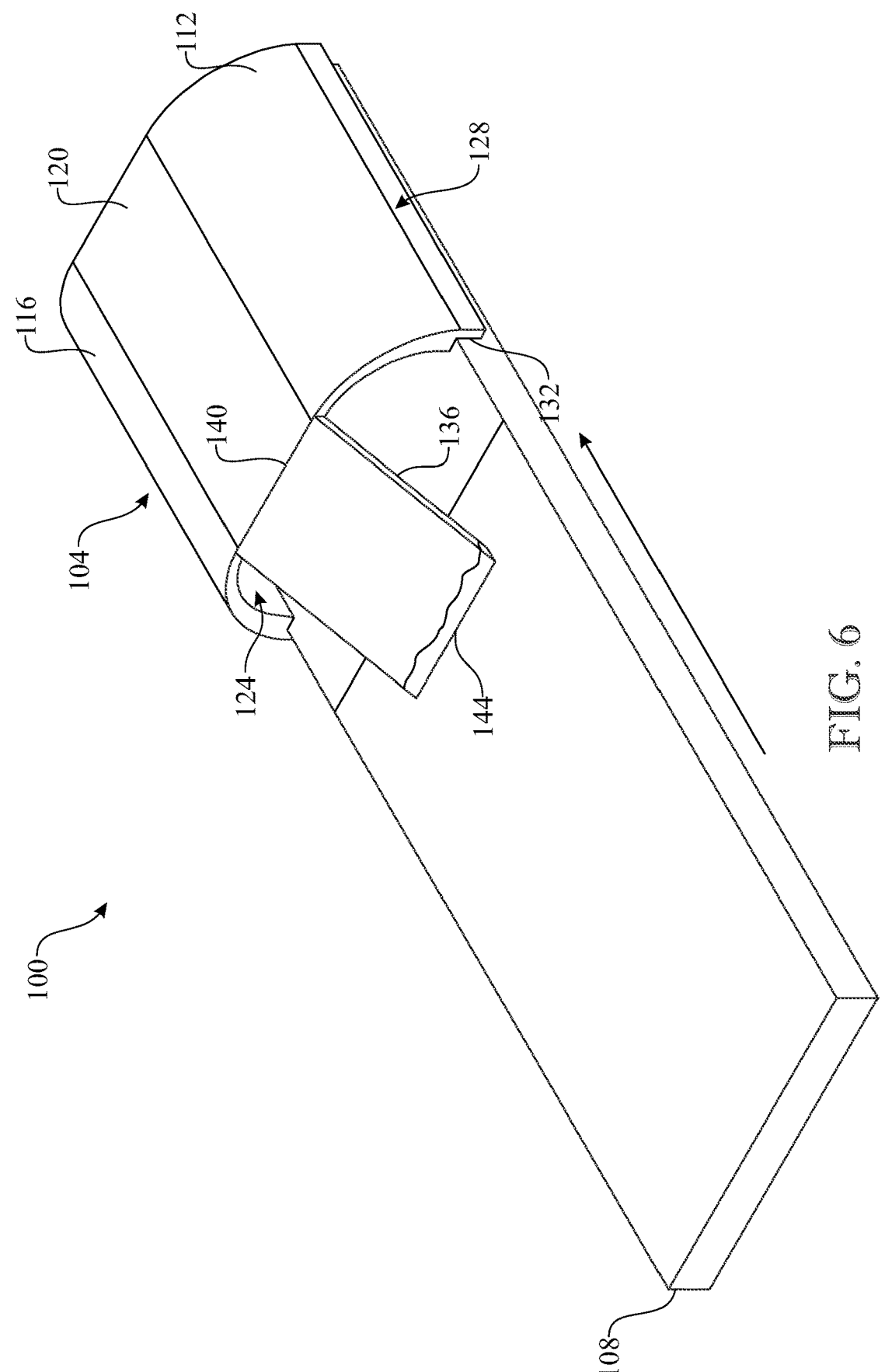
FIG. 6 presents a perspective view of the apparatus for producing consistent blood and bone marrow smears illustrated in FIG. 5, shown with the smearer pulled back such that the distal end of slide touches the at least one blood droplet.

As best shown in FIG. 6, after the distal end of the angular spreader portion 106 has been placed in front of the of the at least one blood droplet or bone marrow aspirate 148, the smearer 104 may be slid back such that the angular spreader portion 136 comes into contact with the at least one blood droplet or bone marrow aspirate 148. Upon coming into contact with the at least one droplet or bone marrow aspirate 148, capillary forces may allow the at least one droplet or bone marrow aspirate 148 to spread evenly along the edge of the end of the angular spreader portion 136.

Figure 7:
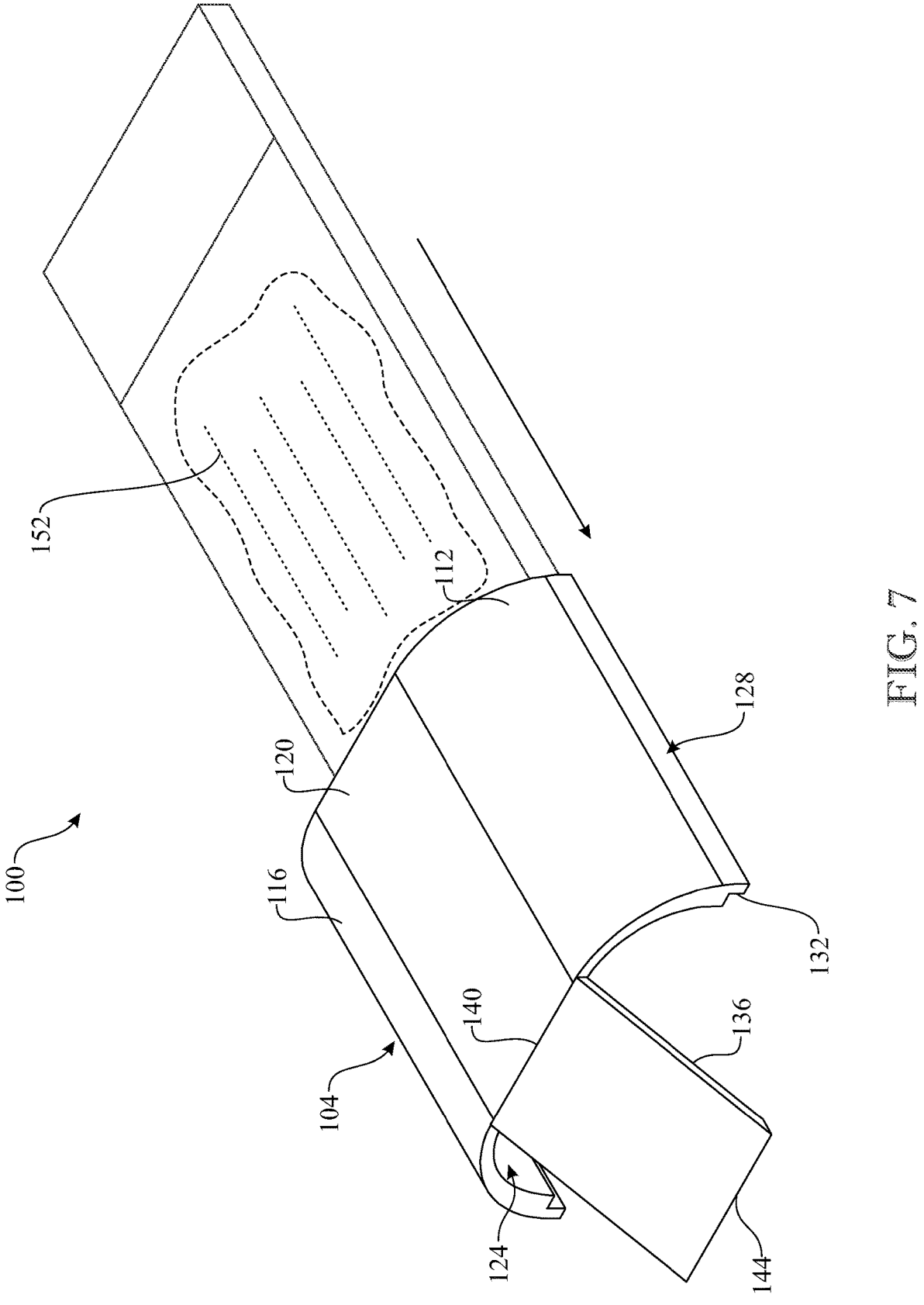
FIG. 7 presents a perspective view of the apparatus for producing consistent blood and bone marrow smears illustrated in FIG. 6, shown with the smearer pushed forward such that the distal end of slide that has engaged with the blood droplet creates a smear.
Figure 8:
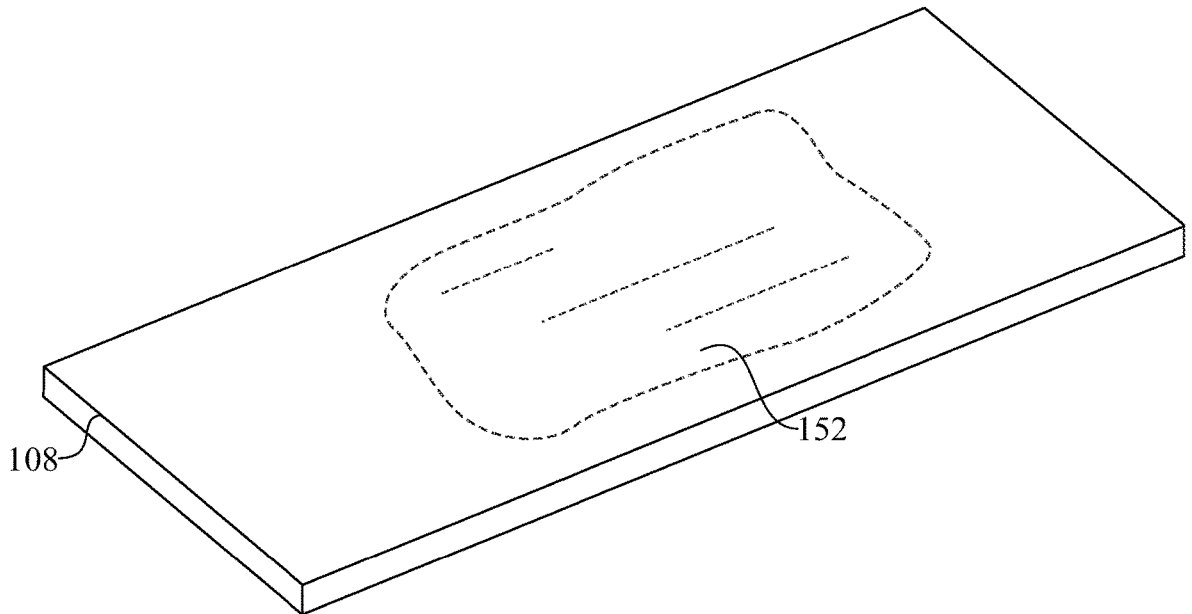
FIG. 8 presents a perspective view of the smear slide created by the apparatus for producing consistent blood and bone marrow smears illustrated in FIG. 7.

As best shown in FIG. 7, after allowing the at least one droplet or bone marrow aspirate 148 to spread evenly along the edge of the end of the angular spreader portion 136 of the smearer 104, the smearer 104 may be pushed all the way to the end of the smear slide 108. As best shown in FIG. 8., this may create a smear 152 with the desired length and thickness.

Alternative embodiments are contemplated to those shown or described herein without departing from the scope of the present disclosure. For example, embodiments are contemplated in which the walls of the plurality of grooves contain a locking mechanism in order to further secure the smear slide within the smearer. Another alternative embodiment considered is placing a grip on the left portion and the right portions of the smearer such that a user may gain a more firm grip of the smearer when use is desired. Another alternative embodiment considered is being able to replace the angular spreader portion of the smearer. Lastly, an embodiment of the invention is envisioned wherein the apparatus includes a mechanism for adjusting the angle between the spreader slide receiver and the smear slide receiver.

In summary, the apparatus disclosed herein provides a user with the ability to create consistent smears of blood and bone marrow as needed. More particularly, the apparatus assists those with unsteady hand or other professional that may not be trained in making such smear samples.

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. An apparatus for producing blood and bone marrow smears comprising:
   a slidable smearer configured to hold a planar smear slide, the slidable smearer including a left portion, a right portion, and an angular spreader portion; and
   a top portion connecting the left portion and the right portion, the top portion having a proximal end of the angular spreader portion connected thereto and protruding from at least one end of the top portion; wherein
   the angular spreader portion is configured to spread and smear at least one of blood and bone marrow placed on the planar smear slide when the slidable smearer is slid along a length of the planar smear slide, the angular spreader portion being positioned at an acute angle relative to the planar smear slide to control the thickness of the smear; and wherein,
   the slidable smearer comprising grooves configured to receive the planar smear slide and allow the planar smear slide to slide in a longitudinal direction along a length thereof.

2. The apparatus of claim 1, wherein the slidable smearer is fabricated from a plastic.

3. The apparatus of claim 1, wherein the left portion and the right portion of the slidable smearer includes an inner surface and an outer surface.

4. The apparatus of claim 3, wherein the inner surface and the outer surface each include a groove.

5. The apparatus of claim 4, wherein the groove is configured to receive the planar smear slide.

6. The apparatus of claim 1, wherein the left portion and the right portion of the slidable smearer are curved and angled outward.

7. The apparatus of claim 6, wherein the left portion and the right portion of the slidable smearer are configured to allow fingers of a user to slide the slidable smearer.

8. The apparatus of claim 1, wherein the slidable smearer conform to an inverted U-shape.

9. The apparatus of claim 1, wherein the angular spreader portion includes a proximal end and a distal end.

10. The apparatus of claim 9, wherein the proximal end of the angular spreader portion connects to the top portion of the slidable smearer.

11. The apparatus of claim 9, wherein the distal end of the angular spreader portion is configured to spread and smear the at least one of blood and bone marrow placed on the planar smear slide.

12. The apparatus of claim 9, wherein the distal end of angular spreader portion is angled at an acute angle relative to the planar smear slide.

13. The apparatus of claim 12, wherein the acute angle is 30 degrees.

14. An apparatus for producing blood and bone marrow smears comprising:

a slidable smearer configured to hold a planar smear slide, the slidable smearer including a left portion, a right portion, and an angular spreader portion, the left portion and the right portion of the slidable smearer including an inner surface and an outer surface having grooves, the grooves configured to receive the planar smear slide and allow the planar smear slide to slide in a longitudinal direction along a length thereof; and a top portion connecting the left portion and the right portion, the top portion having a proximal end of the angular spreader portion connected thereto and protruding from at least one end of the top portion; wherein the angular spreader portion is configured to spread and smear at least one of blood and bone marrow placed on the planar smear slide when the slidable smearer is slid along a length of the planar smear slide, the angular spreader portion being positioned at an acute angle relative to the planar smear slide to control the thickness of the smear.

15. The apparatus of claim 14, wherein the angular spreader portion includes a proximal end and a distal end.

16. The apparatus of claim 15, wherein the proximal end of the angular spreader portion connects to the top portion of the slidable smearer.

17. The apparatus of claim 15, wherein the distal end of the angular spreader portion is configured to spread and smear the at least one of blood and bone marrow placed on the planar smear slide.

18. The apparatus of claim 15, wherein the distal end of angular spreader portion is angled at an acute angle relative to the planar smear slide.

19. The apparatus of claim 18, wherein the acute angle is 30 degrees.

20. An apparatus for producing blood and bone marrow smears comprising:

a slidable smearer configured to hold a planar smear slide having a first width, the slidable smearer including a left portion, a right portion, and an angular spreader portion having a second width, wherein the first width of the planar smear slide is greater than the second width of the angular spreader portion, the left portion and the right portion of the slidable smearer including an inner surface and an outer surface having grooves, the grooves configured to receive the planar smear slide and allow the planar smear slide to slide in a longitudinal direction along a length thereof; and a top portion connecting the left portion and the right portion, the top portion having & proximal end of the angular spreader portion connected thereto and protruding from at least one end of the top portion, the angular spreader portion including a proximal end and a distal end, the proximal end of the angular spreader portion connecting to the top portion of the slidable smearer, and the distal end coming into contact with the planar smear slide at an acute angle; wherein the angular spreader portion is configured to spread and smear at least one of blood and bone marrow placed on the planar smear slide when the slidable smearer is slid along a length of the planer smear slide.

\* \* \* \* \*